United States Patent
Kedefors et al.

(10) Patent No.: US 8,606,242 B2
(45) Date of Patent: Dec. 10, 2013

(54) SYSTEMS AND METHODS TO PROVIDE CONTEXT INFORMATION FOR MOBILE COMMUNICATION DEVICES

(75) Inventors: Hans Kedefors, Hillsborough, CA (US); King-Hwa Lee, Bellevue, WV (US); Peter S. Lim, Hillsborough, CA (US); Kevin Nix, Livermore, CA (US)

(73) Assignee: SAP AG, Walldorf (DE)

( * ) Notice: Subject to any disclaimer, the term of this patent is extended or adjusted under 35 U.S.C. 154(b) by 906 days.

(21) Appl. No.: 12/609,494

(22) Filed: Oct. 30, 2009

(65) Prior Publication Data
US 2011/0105095 A1    May 5, 2011

(51) Int. Cl.
*H04M 3/42*    (2006.01)
*H04W 4/00*    (2009.01)

(52) U.S. Cl.
USPC .................................. 455/414.1; 455/466

(58) Field of Classification Search
USPC .................... 455/414.1, 418, 456.1
See application file for complete search history.

(56) References Cited

U.S. PATENT DOCUMENTS

| 2005/0032527 A1* | 2/2005 | Sheha et al. | 455/456.1 |
| 2008/0009268 A1* | 1/2008 | Ramer et al. | 455/412.1 |
| 2008/0045265 A1* | 2/2008 | Yach et al. | 455/556.1 |

* cited by examiner

*Primary Examiner* — Michael Faragalla
(74) *Attorney, Agent, or Firm* — Buckley, Maschoff & Talwalkar LLC

(57) ABSTRACT

According to some embodiments, an initiating event may be detected at a mobile communication device via a context application, and responsive to that detection, information may be searched. The searched information may be related to, for example, prior communication events associated with communication applications of the mobile device. Note that the searched information could be locally stored and/or remotely stored (e.g., at a data store of a remote CRM application). At least one result of the search may then be displayed to the user.

19 Claims, 18 Drawing Sheets

SYSTEMS AND METHODS TO PROVIDE CONTEXT INFORMATION FOR MOBILE COMMUNICATION DEVICES

BACKGROUND

1. Field

Embodiments may generally relate to mobile communication devices. More particularly, some embodiments may be concerned with efficiently providing context information to a user of a mobile communication device.

2. Description

A user of a mobile communication device, such as a Smartphone, may access various native applications on the device to initiate and receive events associated with communications between the user and other people and devices. For example, a user might receive a wireless telephone call from a particular person and later receive an email from that same person via his or her Smartphone. Moreover, the various native applications executing at the mobile communication device typically store information about the communication events in different information stores. For example, a telephone log, email history, contact list, and calendar application might separately store information about prior communication events. Similarly, external business data such as Customer Relationship Management (CRM) data, information associated with social networking sites (such as Facebook or Twitter), and data managed by third party applications are generally stored in separate databases.

As a result, when a user performs typical day-to-day communication operations using native phone applications, he or she may be unable to quickly get an accurate overview of a situation and view related data that pertains to a person or enterprise associated with past, current, or future communication events. For example, a person who receives a telephone call from a customer might not realize that he or she has already discussed a particular issue with that customer via a social networking site.

Systems and methods are therefore desired to integrate and provide context appropriate information associated with multiple native applications for a mobile communication device.

SUMMARY

Some embodiments provide a system, method, program code and/or means to detect an initiating event at a mobile communication device via a context application. Responsive to that detection, information may be searched. The searched information may be related to, for example, prior communication events associated with communication applications of the mobile device. Note that the searched information could be locally stored and/or remotely stored (e.g., such as a data store of a remote CRM application). At least one result of the search may then be displayed to the user.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts.

DETAILED DESCRIPTION

Figure 1:
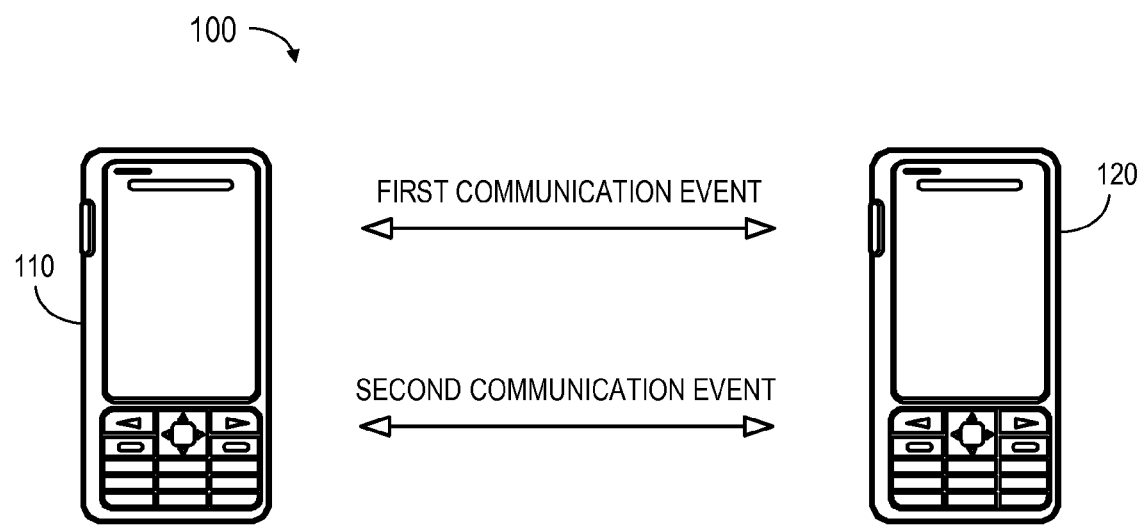
FIG. 1 is a block diagram of a system according to some embodiments.

FIG. 1 is a block diagram of a system 100 according to some embodiments. In particular, a first mobile communication device 110 may transmit information to or receive information from another party or device, such as a second mobile communication device 120. As used herein, a "mobile communication device" may be associated with, for example, a wireless Smartphone, a Personal Digital Assistant (PDA), or any device adapted to exchange information with other devices.

According to some embodiments, a first communication "event" may occur between the first and second devices 110, 120. As used herein, the term "event" might refer to, for example, a telephone call, an email, a calendar event (e.g., a meeting request), a social networking site event (e.g., a post or comment), a text message, including a Simple Messaging Service (SMS) text message, or an image. Note that the event may be either an inbound or outbound event from the perspective of the first mobile communication device 110. Moreover, the event, or log of the event, may include information that can be used as a key (e.g., a phone number, email address, subject line) to lookup data that may have context-related information. Although the second device 120 illustrated in FIG. 1 is a wireless telephone, note that it may be any other type of device able to exchange information, such as a land line telephone, a computer, a web-based communication service, etc.

Subsequently, a second communication event may occur between the first and second devices 110, 120. Note that the second communication event could instead occur between the first device 110 and a third communication device (not illustrated in FIG. 1). For example, a user might first receive a telephone call from a friend and later send his or her friend an email message using the device 110. Note that the phone log and email history of the device 110 could be associated with different native applications and each application might store event information in different local databases. As a result, the user could find it difficult to quickly access context appropriate information associated with different native applications. Similarly, information stored remote from the first device 110 might be of interest to the user (e.g., information associated with a CRM application) and context appropriate elements of this type of information could also be difficult to access.

Figure 2:
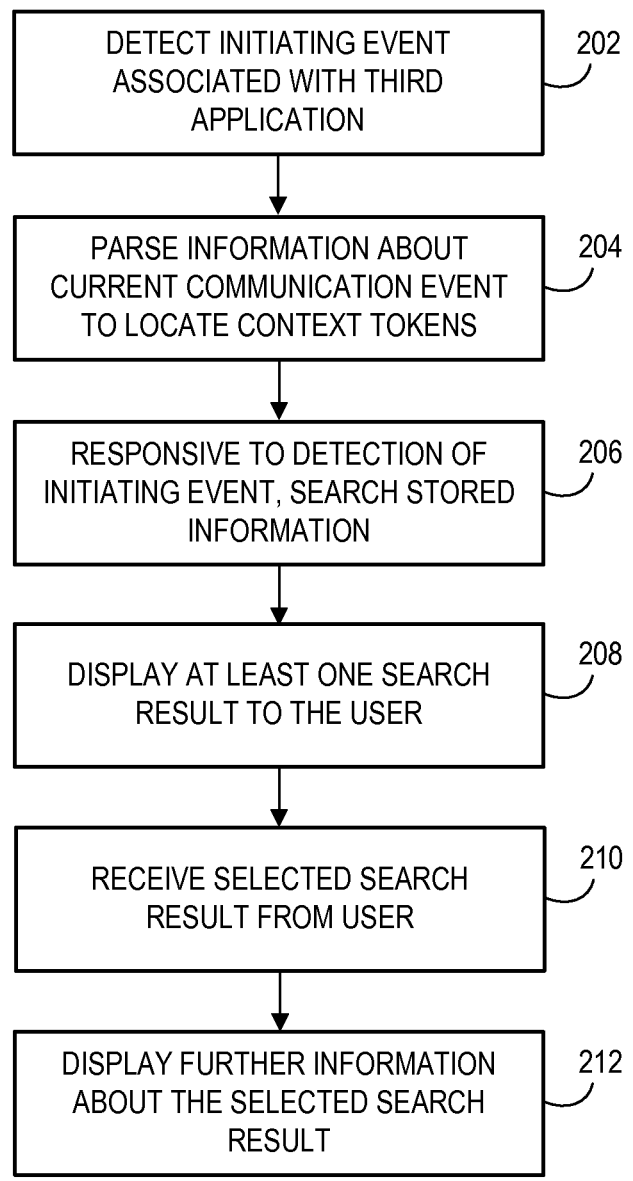
FIG. 2 is a flow diagram of a process according to some embodiments.

To help avoid such problems, some embodiments of the present invention may provide a local information store or cache at the mobile device 110 to track context information associated with multiple native applications. Similarly, information stored at a remote server (e.g., related to a CRM application) may be searched to determine appropriate context information associated with a communication event of the mobile device 110. FIG. 2 illustrates a method that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, an initiating event associated with a context application may be detected. The initiating event might comprise, for example, a user request (e.g., he or she may press a physical button or select an icon on a display of the device 110). The initiating event might instead comprise, for example, the occurrence of a new or current communication event (e.g., the user might receive an email from the client).

According to some embodiments, a current communication event may be "parsed" to determine one or more context tokens that may be of interest to a user. Moreover, according to some embodiments, the tokens may be stored in a local cache or event database and might include, for example, an event type (e.g., indicating which native application was associated with the event), an event date, an event time, a party identifier, an event subject, an event duration, attachment information, and/or a "parsed" token key words or phrases (e.g., strings of characters that might be of interest to the user at a later time).

According to some embodiments, a list of context tokens may be displayed to the user. For example, when a user receives an email, a context application might automatically parse text information associated with the email using a keyword list and display a set of tokens to the user. The set may be prioritized (e.g., with those tokens more likely to be of interest being placed near the top of the display). The user may then select one or more of the context tokens. Those selected tokens can be used to perform a search and the result of the search may be displayed to the user. Note that the parsing might be associated with a keyword list, an alias list (e.g., correlating nicknames and abbreviations), a language analyzer (e.g., using the syntax of one or more languages to identify potential tokens of interest), and/or a speech-to-text converter.

At 206, stored information is searched responsive to the detection of the initiating event. For example, if the initiating event was an email from the client, the "from" and "subject" portions of the email might be used to search a local event cache or database for similar items. According to some embodiments, data stores maintained by other applications (including those store locally on the mobile communication device 110) may be searched for context appropriate information. Note that some or all of the stored information might be maintained by other applications and may further be stored remote from the mobile communication device 110. Such information might be associated with, for example, CRM systems, news sources, social networking systems, and/or contact management systems. According to one embodiment, the communication device makes a web service call to a remote application using a preconfigured or known service access point in order to search for identified context tokens or a user-selected context token.

At least one result of said searching may then be displayed to the user at 208. For example, a list including the scheduled meeting and telephone call between the user and the client might be displayed to the user. According to some embodiments, the user may then select one f the search results at 210, and further information about the selected search result may be displayed to the user at 212 (e.g., so that he or she may "drill down" to view additional details).

Figure 3:
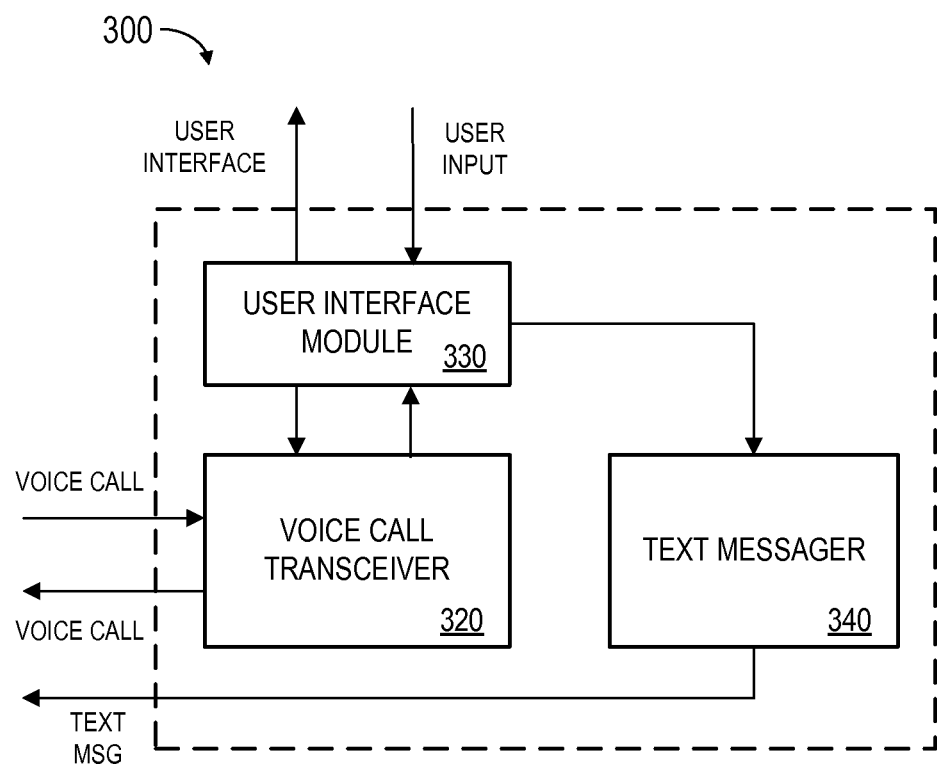
FIG. 3 is block diagram of a mobile communication device according to some embodiments.

FIG. 3 is a block diagram of device 300 according to some embodiments. Device 300 may handle communication events (including voice calls and email messages) and present one or more items of context appropriate information to a user. Device 300 may comprise different types of portable devices, including cellular telephones, Personal Digital Assistants (PDAs), digital media players, digital cameras, wireless email devices, and any other device for receiving or transmitting various types of communications, such as voice calls, that is or becomes known.

Device 300 includes voice call transceiver 320, user interface module 330, and text messager 340. Each element of device 300 may comprise any combination of hardware and/or or software components suitable for providing the functions attributed thereto herein. Two or more of transceiver 320, user interface module 330, and text messager 340 may share one or more constituent components, and, in some embodiments, device 300 may include unshown elements for providing the functions described herein.

Voice call transceiver 320 may receive and transmit voice calls via any suitable protocol. Voice call transceiver 320 may also receive caller information associated with received voice calls. The caller information may comprise caller ID information and/or any other information that device 300 may use to identify a party from whom a voice call is received.

A user input may be transmitted to voice call transceiver 320 by user interface module 330. In this regard, voice call transceiver 320 may notify module 330 of the reception of the voice call. User interface module 330 may present a user interface to a user in response to the notification. The user interface, examples of which are described below, may present context appropriate information related to a received voice call or other communication event detected by the device 300.

User interface module 330 may also instruct text messager 340 to transmit a text message. In response, text messager 340 transmits a text message using a suitable text messaging service. The text messaging service may comprise any currently- or hereafter-known text messaging service. Conventional examples include IM, SMS, Multimedia Message Service (MMS), Enhanced Message Service (EMS), and electronic mail.

Context information about communication events handled by the voice call transceiver 320 and text message 340 may be stored at the device 300 and provided to the user as appropriate via the user interface module 330. As a result, some embodiments of the FIG. 1 system 100, the FIG. 2 process, and/or the FIG. 3 device 300 may provide more efficient and enhanced communications than previously available. Although the device 300 illustrated in FIG. 3 may be associated with a wireless telephone network, note that any of the embodiments described herein may be associated with other types of devices, including devices that exchange voice information via Internet Protocol (IP) packets.

Figure 4:
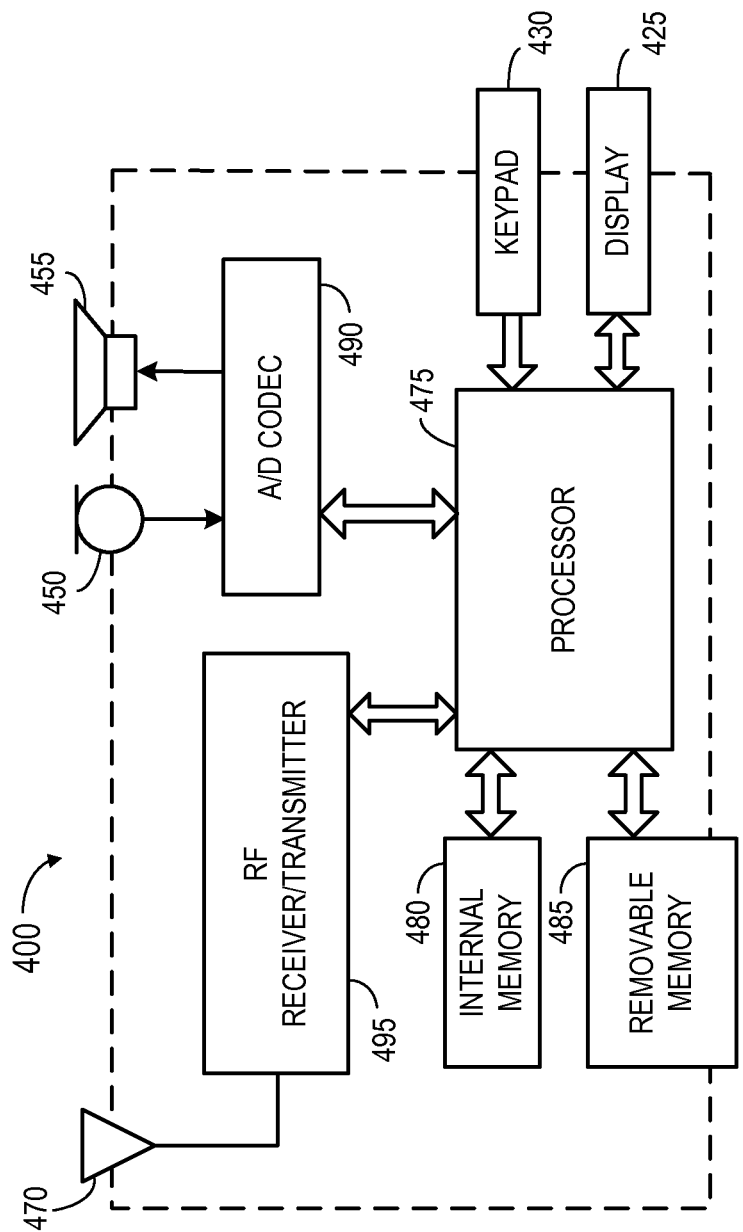
FIG. 4 is a block diagram of the internal architecture of a wireless telephone according to some embodiments.

FIG. 4 is a block diagram of the internal architecture of cellular telephone 400 according to some embodiments. As shown, cellular telephone 400 includes processor 475, which may be a conventional microprocessor, microcontroller and/or digital signal processor (DSP) or other control circuit conventionally provided in a cellular telephone. Processor 475 is shown in communication with keypad 430 and display 425 for control thereof.

Also included in the cellular telephone 400 are internal memory 480 and removable memory 485. Internal memory 480 may include one or more of ROM (read only memory), RAM (random access memory, e.g., static RAM), and flash memory. Removable memory 485 may comprise a flash memory, a Subscriber Identity Module (SIM) card or any other removable memory that is or becomes known. Cellular telephone 400 may therefore be equipped with an interface for physically receiving and transferring data to and from removable memory 485.

Note that a communication event database might be stored in the internal memory 480 and/or the removable memory 485. Memories 480 and 485 may also store program code that is executable by processor 475 to control telephone 400. The program code may include but is not limited to operating system program code, application program code, device driver program code, and database connector program code. The program code may include code to cause telephone 400 to perform functions that are described herein. In some embodiments, the program code is executable to provide a voice call transceiver, a user interface module and a text messager as described with respect to FIG. 3.

Memories 480 and 485 may also store data used in the operation of cellular telephone 400. Such data may include phone numbers, addresses, access codes, stored audio files, text corresponding to the stored audio files, and other data. Some or all of the data may be read-only, while other of the data may be rewritable.

Analog/digital coder/decoder (A/D codec) 490 is also in communication with processor 475. A/D codec 490 may receive analog signals from microphone 450, convert the analog signals to digital signals, and pass the digital signals to processor 475. Conversely, processor 475 may transmit digital signals to A/D codec 490, which converts the digital signals to analog signals and passes the analog signals to speaker 455. Speaker 455 then emits sound based on the analog signals.

RF receiver/transmitter 495 is operatively coupled to antenna 470. RF receiver/transmitter 495 may, in accordance with conventional practices, comprise a combination of two or more different receive/transmit modules (not separately shown) that operate in accordance with mutually different radio communication protocols to provide various services for the cellular telephone 400. For example, receiver/transmitter 495 may operate in accordance with one radio communication protocol to provide conventional two-way service for cellular telephone 400, and may operate in accordance with another radio communication protocol to provide PoC service for cellular telephone 400.

Those in the art will understand that the block diagram of FIG. 4 is simplified in a number of ways. For example, all power and power management components of cellular telephone 400 are omitted from the diagram. Also, some embodiments may employ an internal architecture somewhat different or completely different from that shown in FIG. 4.

Figure 5:
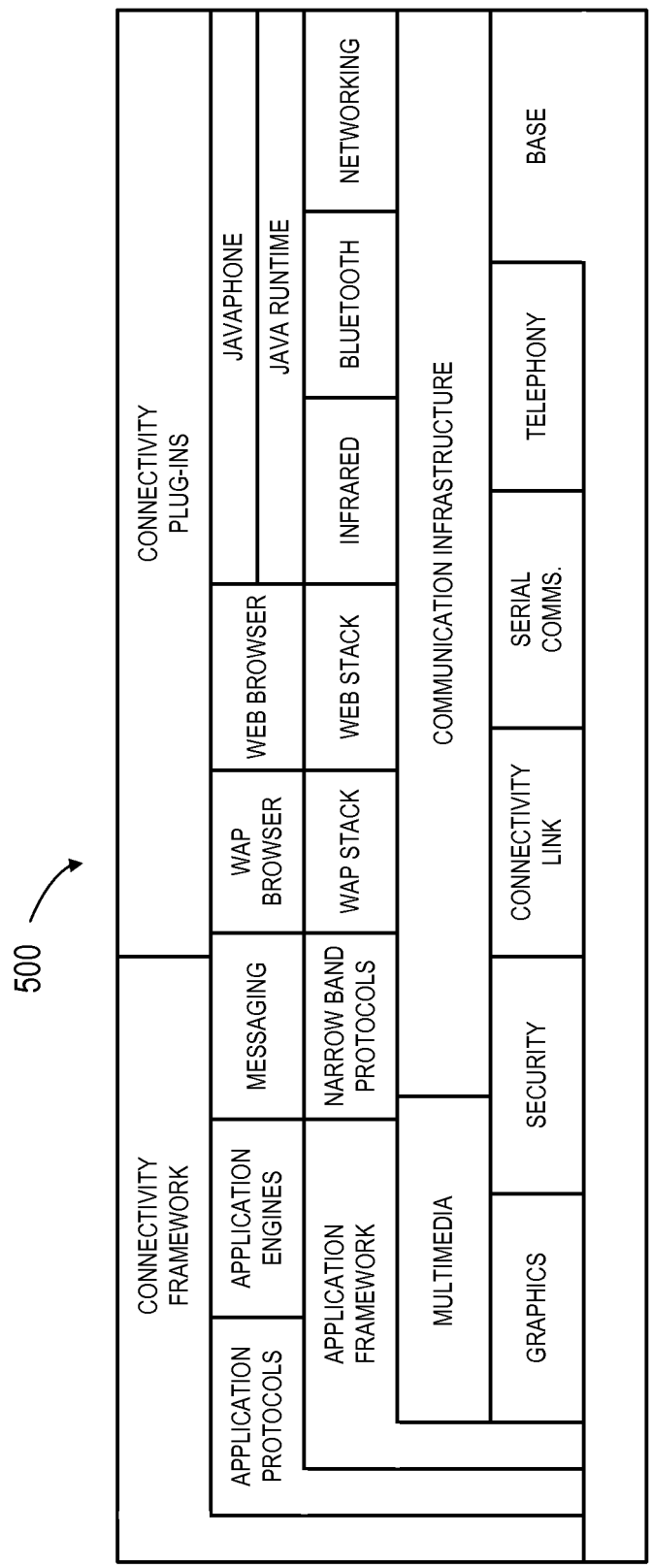
FIG. 5 is a block diagram of a telephone operating system according to some embodiments.

FIG. 5 is a block diagram of an operating system architecture 500 that may be used in conjunction with some embodiments. Architecture 500 corresponds to the Symbian™ cellular telephone operating system. Any suitable operating system may be used in conjunction with some embodiments, including those not intended and/or usable with cellular telephones. Suitable operating systems according to some embodiments include but are not limited to Palm OS™, Windows Mobile™, RIM Blackberry™, and operating systems suitable for devices capable of transmitting text messages (e.g., PDAs and digital media players). According to some embodiments, the application engines portion of the architecture includes at least one engine to store and search a communication event database.

Figure 6:
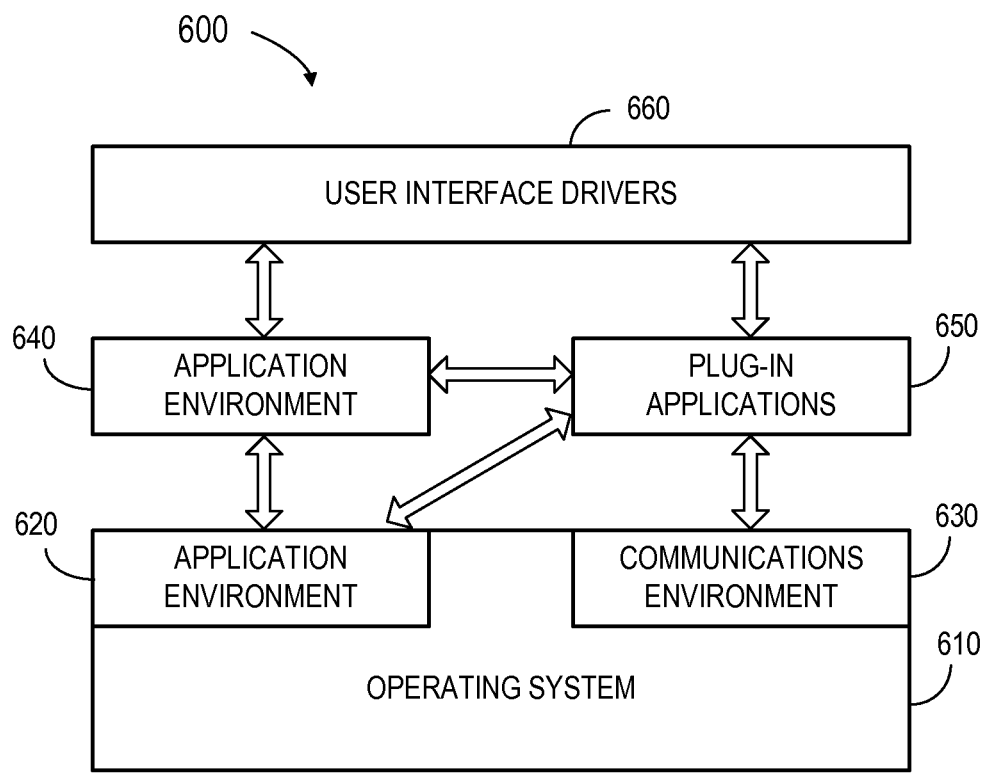
FIG. 6 is a block diagram of the software architecture of a telephone according to some embodiments.

FIG. 6 is a block diagram of a general software architecture 600 that may be used within a cellular telephone in conjunction with some embodiments. Architecture 600 may operate to detect communication events initiated at or received by the telephone and to display context-appropriate information about past events to a user of the telephone.

Architecture 600 includes operating system 610, which may comprise architecture 500 of FIG. 5. In such a case, application environment 620 and communications environment 630 may correspond, respectively, to the connectivity framework and the connectivity plug-ins of architecture 500. Generally, application environment 620 provides a platform by which another application environment 640 may interface with operating system 610. Application environment 640 may comprise a C, Java™ or any other programming environment. As such, plug-in applications 650 may be written in Java or C for execution by cellular telephone. Plug-in applications 650 may also be written for the application interface provided by application environment 620.

Communications environment 630 provides plug-in applications 650 with access to the communications functionality of operating system 610. This functionality may include text messaging, Web browsing and of course telephone communication. Plug-in applications 650 may also transmit data and commands to and receive input from user interface drivers 660 for control of the user interfaces of telephone.

Figure 7:
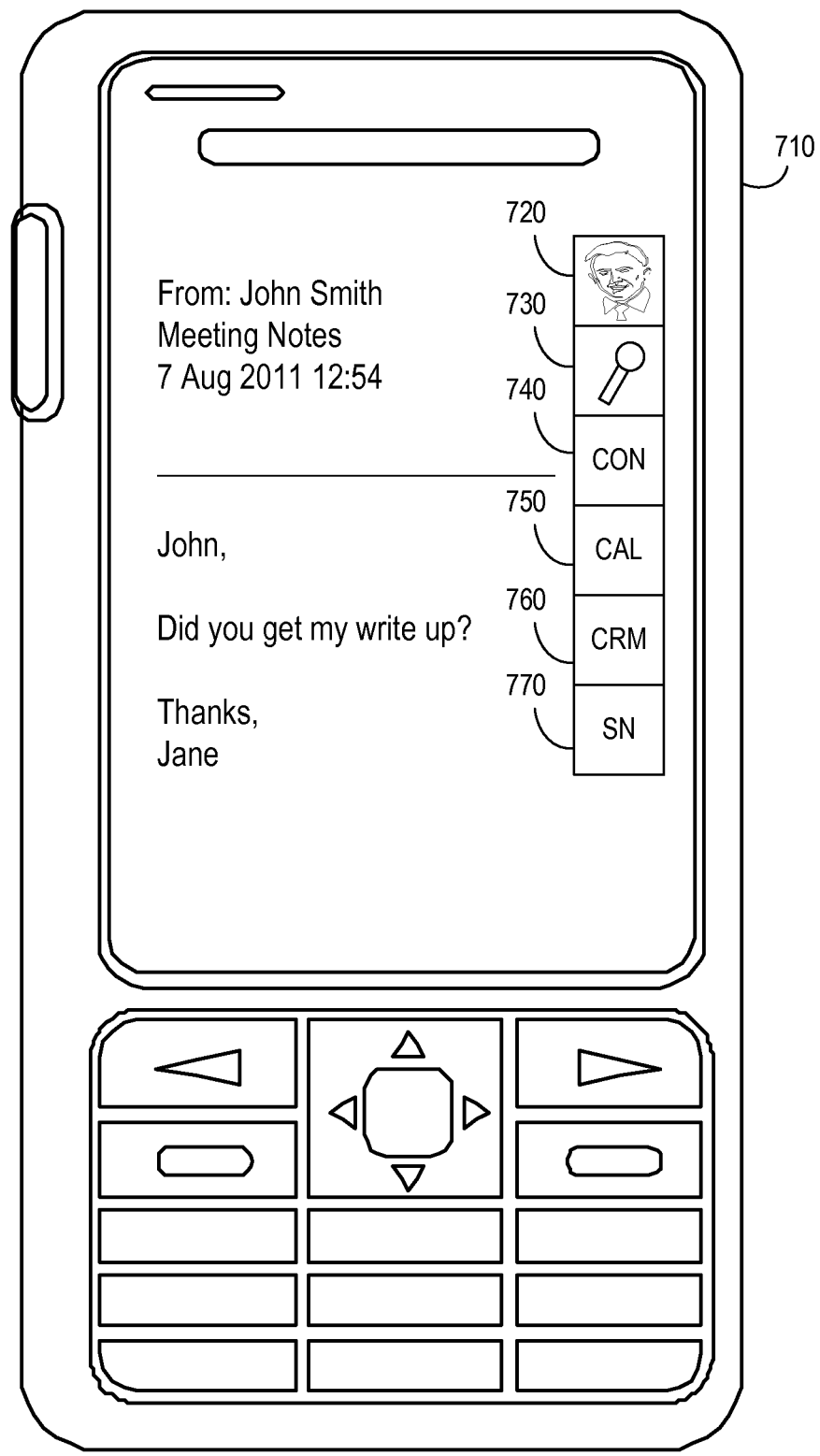
FIGS. 7 through 14 illustrate wireless telephone displays according to some embodiments of the present invention.

According to some embodiments, an application executing in the application environment 620 stores information into and retrieves information from a communication event database. Moreover, context appropriate information may be displayed to a user of the telephone. For example, FIG. 7 illustrates a wireless telephone 710 display of an email application and a side panel of selectable icons 720 through 770. These icons might be displayed, for example, at the right edge of the screen when the user opens an email. The panel may let a user easily and quickly determine information about other communication events that may be related, context wise, to the current email. The panel might include a context people search icon 730, allowing a user to quickly search across his or her contact data sources stored on a remote server. It may also show a direct link to any matching data already locally cached in a context client (e.g., a photo 720) along with a contact icon 740 ("CON"), calendar icon 750 ("CAL"), a CRM icon 760, and/or a social networking site icon 770 ("SN").

Figure 8:
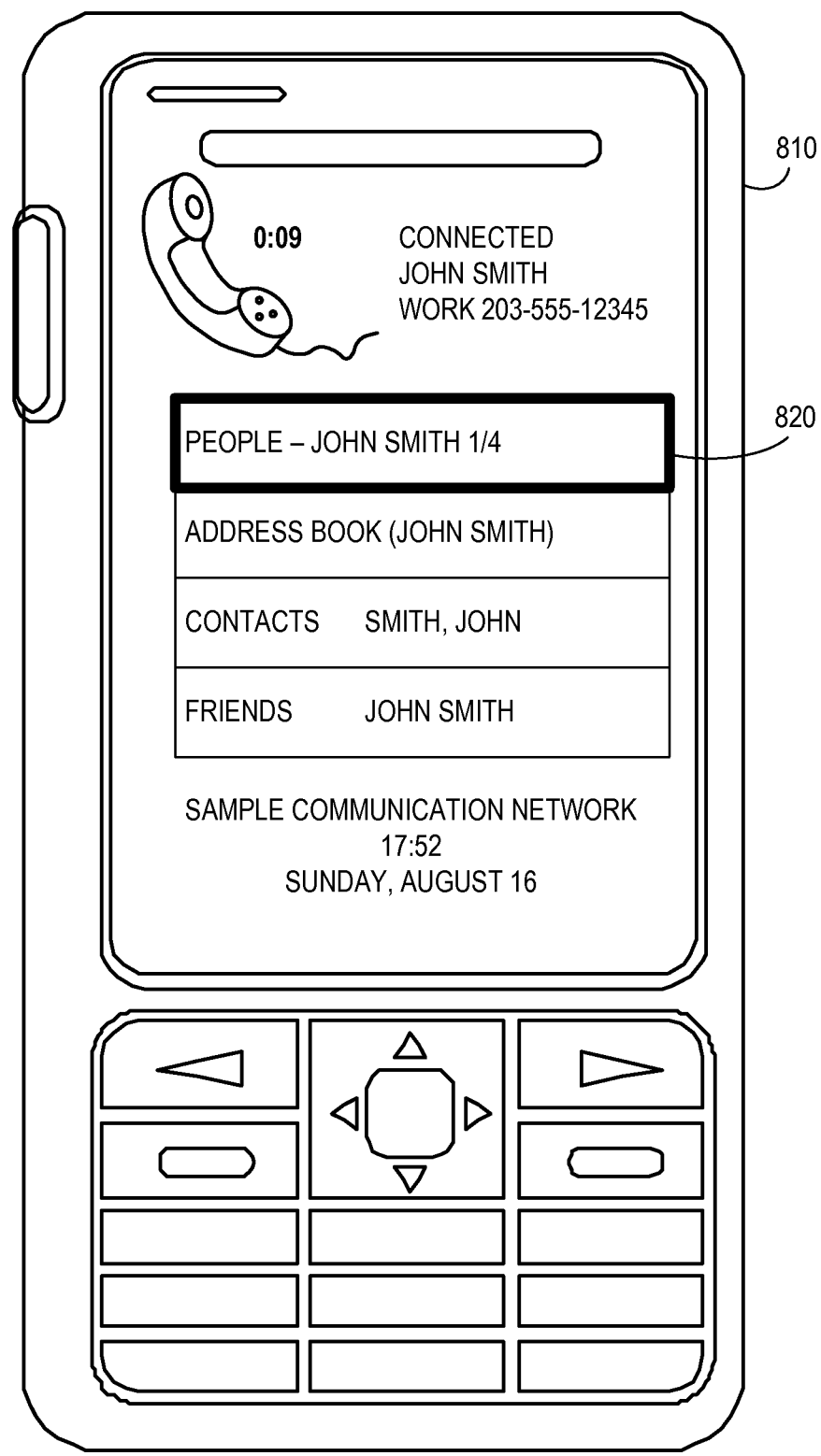

FIG. 8 illustrates a wireless telephone 810 display of a people search feature in a native phone application. In this embodiment, a context people search window 820 may be provided in the native phone application during an incoming call. The people search screen 820 might include data from a number of different applications as appropriate based on information stored in a local communication event database. A query to a remote context server may, according to some embodiments, also be automatically executed (e.g., based on a caller identifier). The results are shown in the window 820 as the query returns and the user can navigate directly to the detailed records in the context client during the call.

Figure 9:
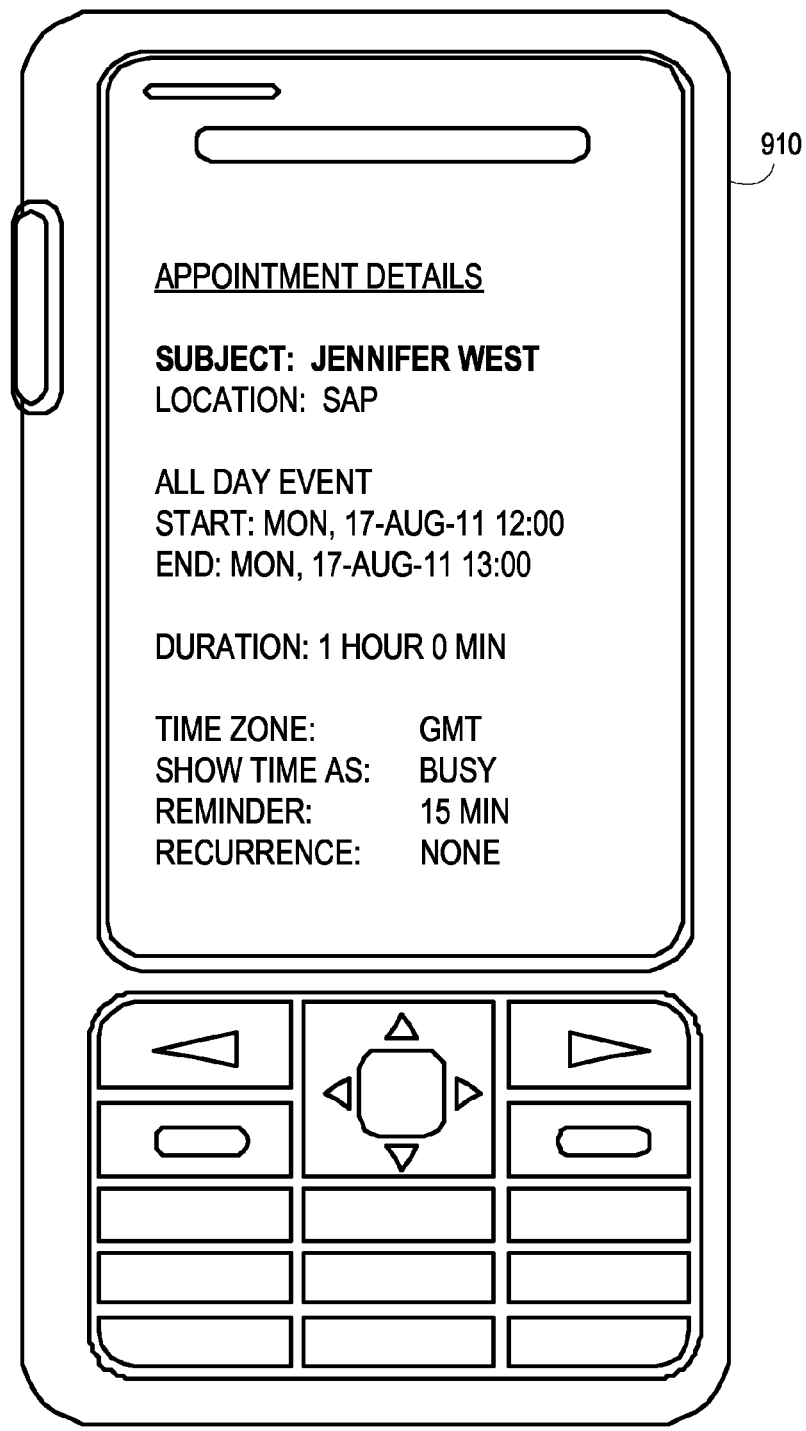

FIG. 9 illustrates a wireless telephone 910 display of a native calendar appointment. In this example, the details of a scheduled meeting may be displayed to a user. According to some embodiments, a user may activate a physical button or an icon on the display to access a menu associated with a context search integration application.

Figure 10:
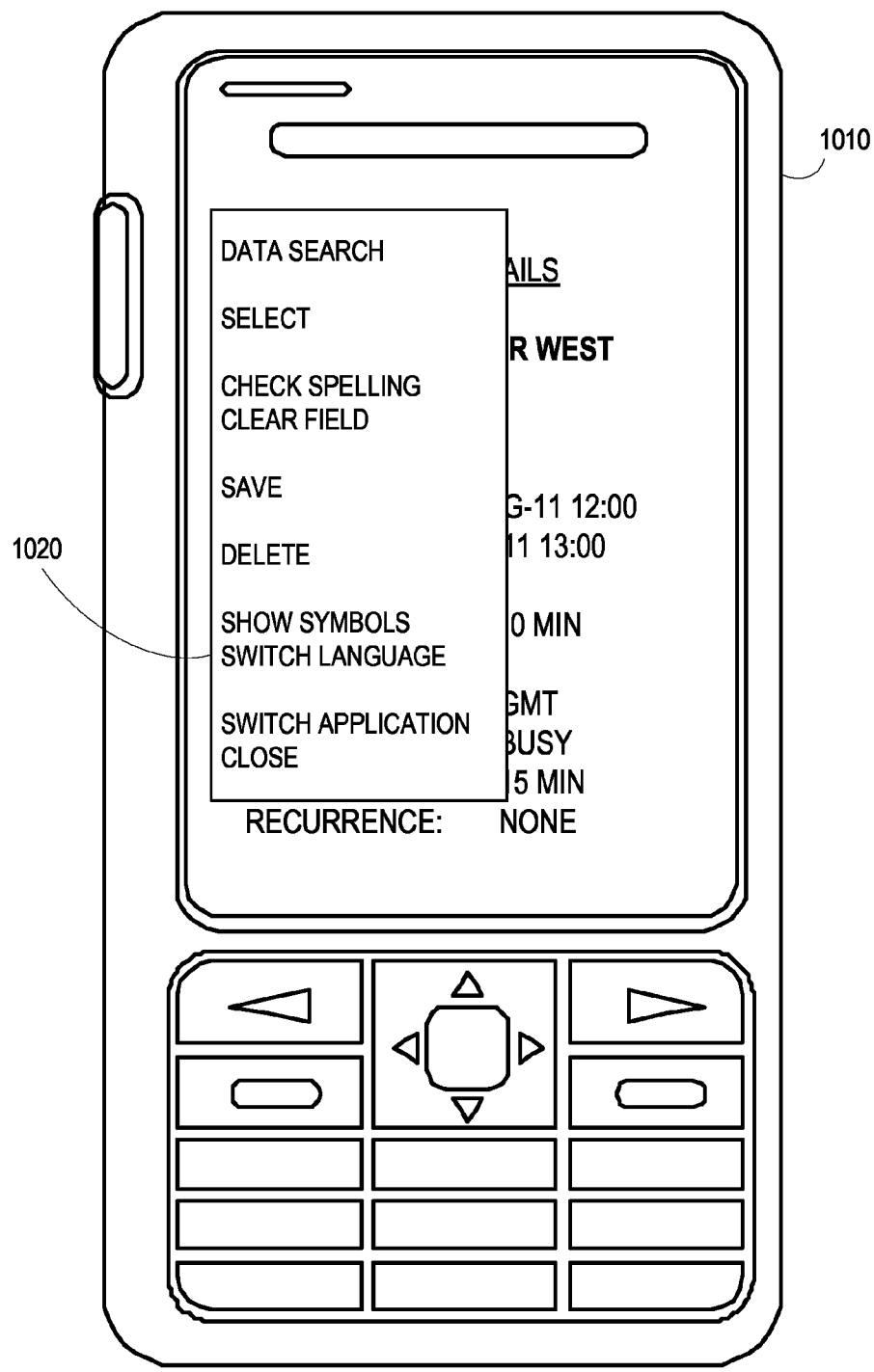

For example, FIG. 10 illustrates a wireless telephone 1010 display of a menu for a calendar application according to some embodiments. The user may make selections from the menu, for example, to save or delete information, to switch or close the application, to check spelling, and/or to clear fields as desired. According to some embodiments, the user may also make a context "Data Search" selection from the menu to perform a context-appropriate data search. That is, the Data Search selection may serve as an integration mechanism from which the user can initiate the search. Click on this selection may extract contextual information from the calendar application and this it to a context application (which, in turn, may use the information to perform a search).

Figure 11:
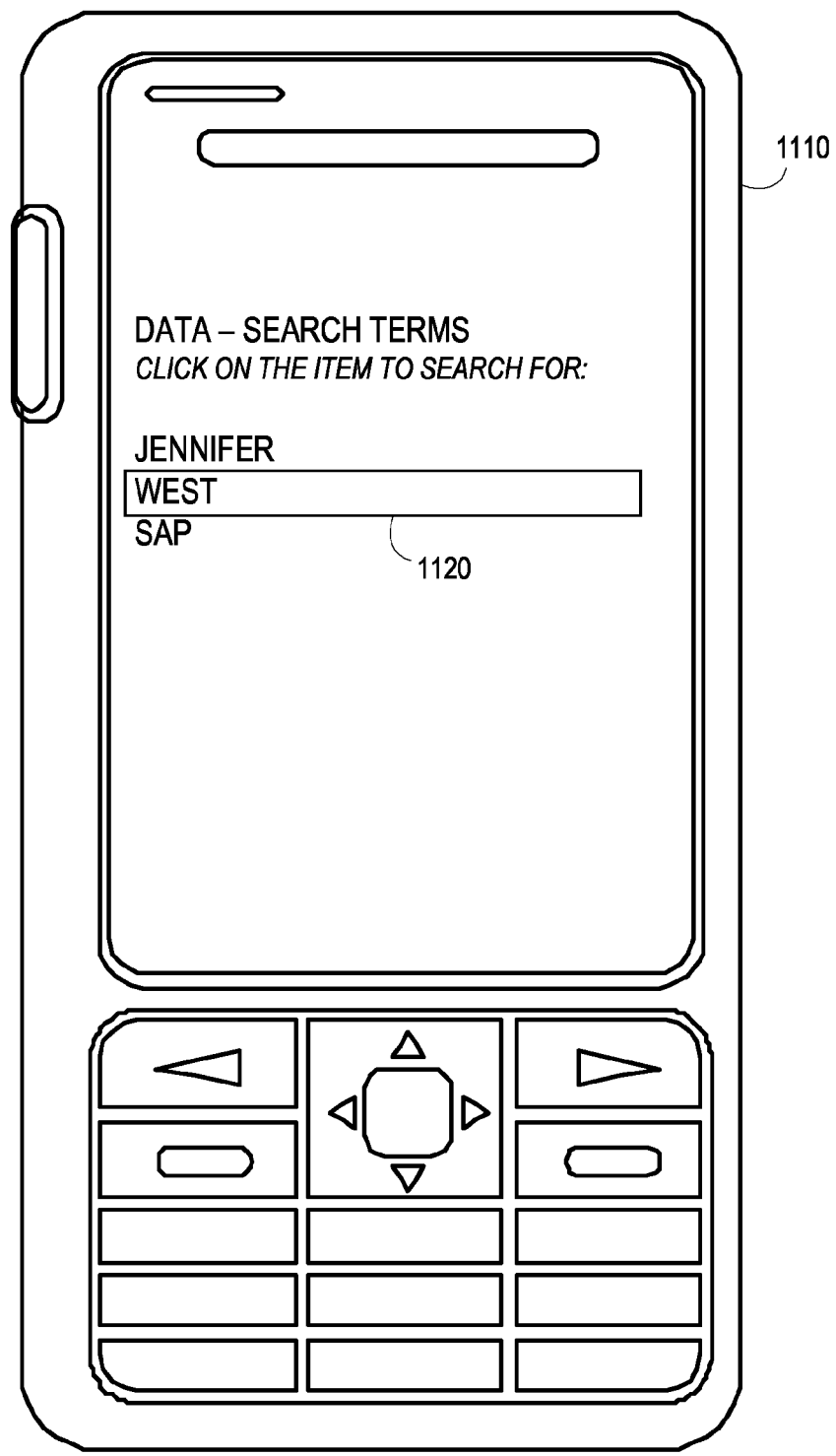
Figure 12:
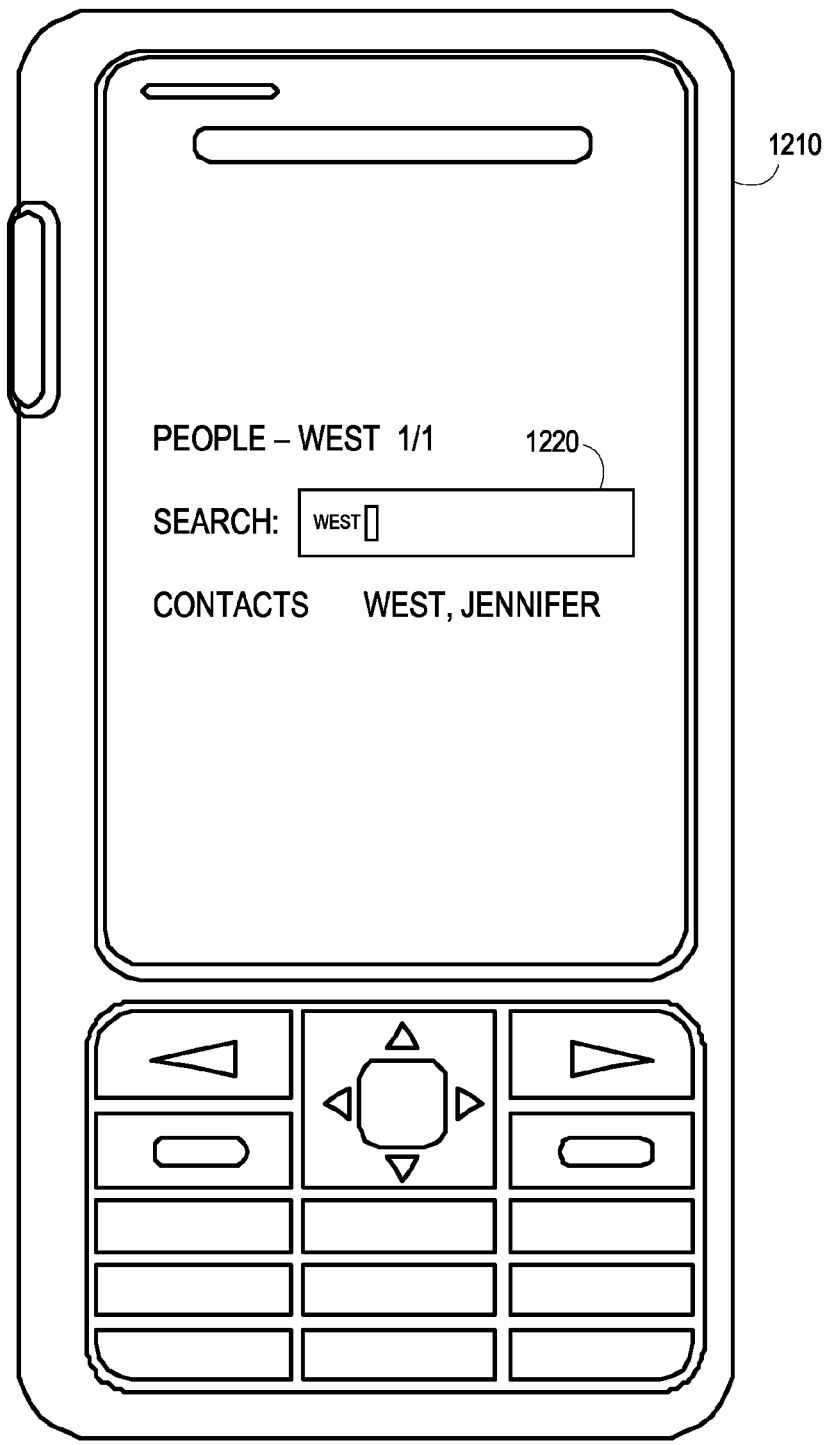

FIG. 11 illustrates a wireless telephone 1110 data search display according to some embodiments. In particular, a list or set of context appropriate tokens have been parsed from the information displayed in FIG. 9: "Jennifer," "West," and "SAP." The user might then select one of the tokens using a selection box 1120 and initiate a search of a local communication event database using that token. The result of such a search are illustrated on the phone 1210 of FIG. 12 (a context people search screen that might be displayed if the user had selected "West" in FIG. 11). A user might also enter or modify the people search term using search box 1220.

Figure 13:
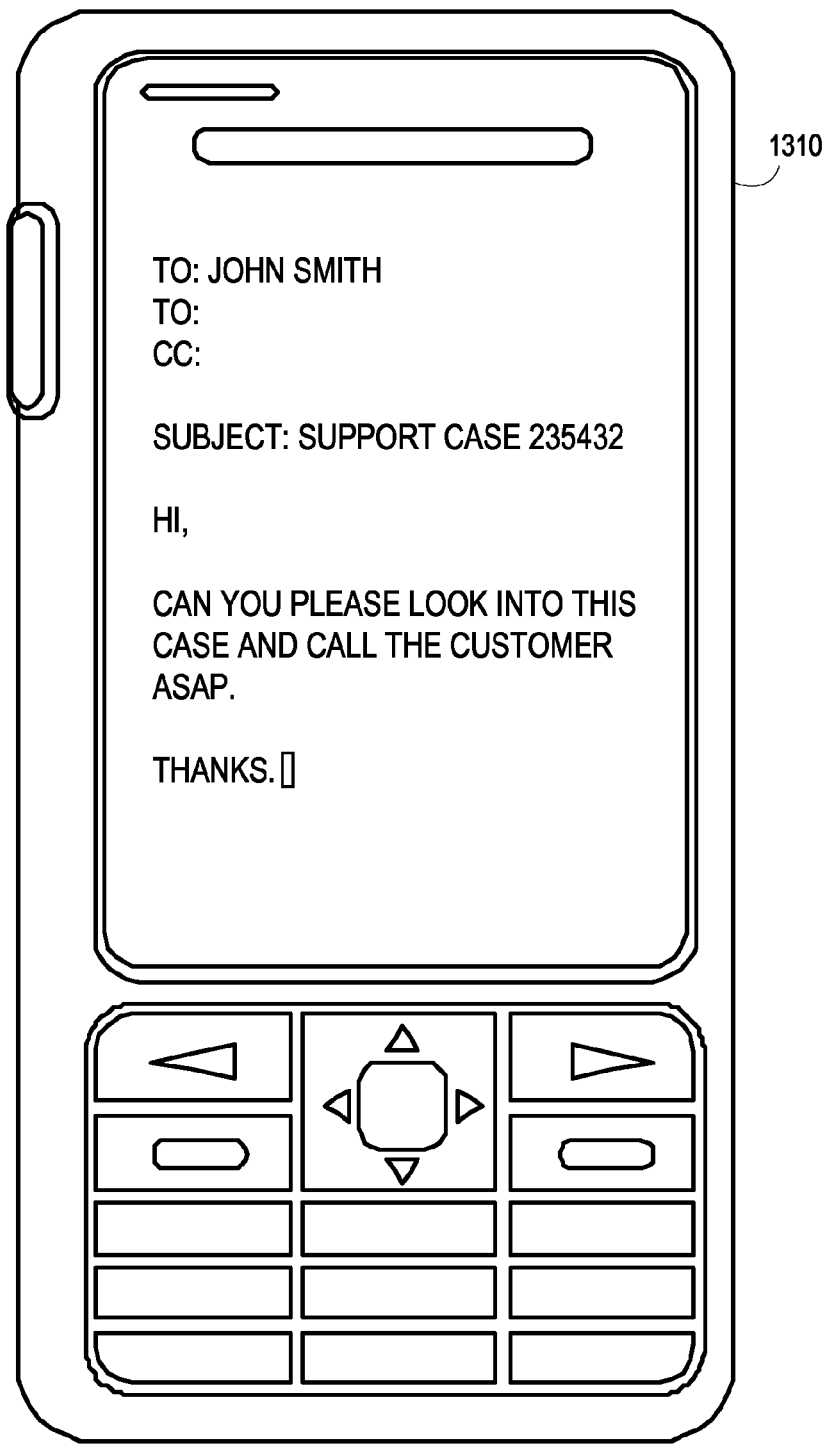
Figure 14:
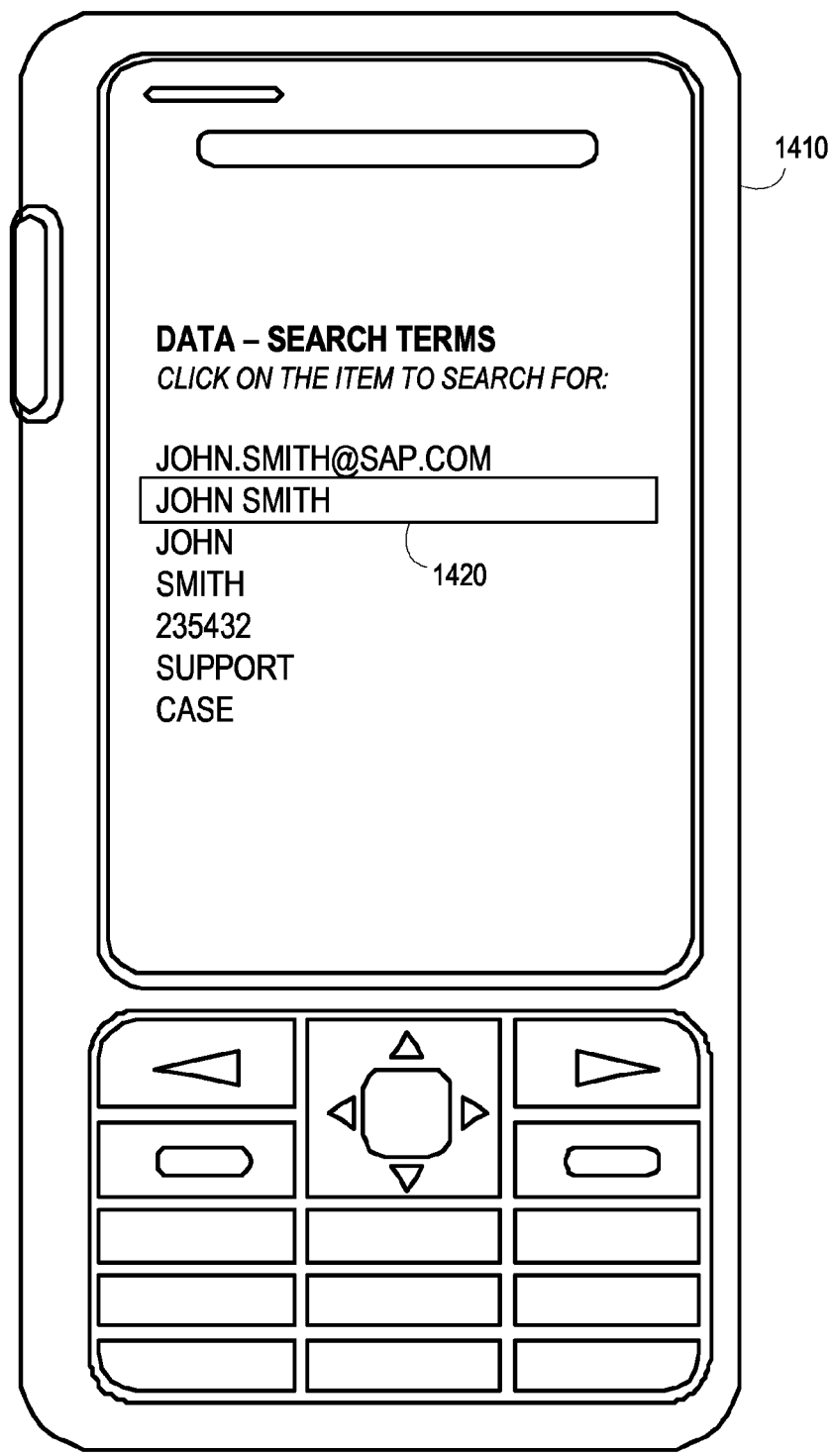

FIGS. 9 though 12 described the parsing of a native calendar appointment to provide context appropriate information to a user, but note that parsing of other types of native information might also be performed. For example, FIG. 13 illustrates a wireless telephone 1310 display of a native email application in which an email to "John Smith" is displayed. Information about this email may be parsed by a client local to the telephone 1310 to determine a set of tokens that might be of interest to the user. For example, FIG. 14 illustrates a wireless telephone 1410 display of context search tokens discovered in the email of FIG. 13 (e.g., it was determined that the support case number "23543" might be of interest to the user). The user might then position a selection box 1420 to perform a search of a local communication event database using that token.

In this way, embodiments may integrate phone communications (including email, voice, and SMS text communication) and Personal Information Management (PIM) apps (e.g., an address book, calendar, and to-do list) with a local context client at a mobile device. Embodiments may allow a user to quickly navigate from phone applications using the information currently being viewed (e.g., "in context") to related data such as CRM information (e.g., contacts, accounts, cases, and/or data in social networks).

Moreover, some embodiments may provide an effective "communicate-in-context" mechanism that matches and links information from phone communication features and PIM apps to data managed by a context application with a simple user gesture. Moreover, the context application may find a relatively substantial percentage of "hits" in local data caches and be usable from calendar, tasks and other native phone applications that do not have explicit fields that store links to the context application. Embodiments may also provide appropriate context information when the inbound communication is from a customer, an employee, a partner, or even a personal friend. Note that embodiments could also be deployed and accessed along with devices other than a mobile Smartphone (e.g., as a plug-in to Microsoft Outlook on a desktop computer).

By way of example, the context application could provide appropriate context to brief a user about somebody the user is currently communicating with. For example, the user might receive a communication from a party (e.g. via an email, a voice call, or a text message), and the user is interested in quickly search for past events associated with that party or a product mentioned by that party.

While viewing the received communication, the user may select a "context icon" on his or her display. As a result, a context application executing at the user's mobile device may open up and parse the communication for "interesting tokens" (e.g., contact names from the sender or cc-list, case numbers, people names, product names from a subject and/or an email body) and displays a list of the interesting tokens to the user. The user may then select a token to review locally stored information about prior communication events that share the same or similar token. As a result, the user can quickly access relevant data without needed to manually enter text into a search (e.g., the operation might be performed with one hand).

Figure 15:
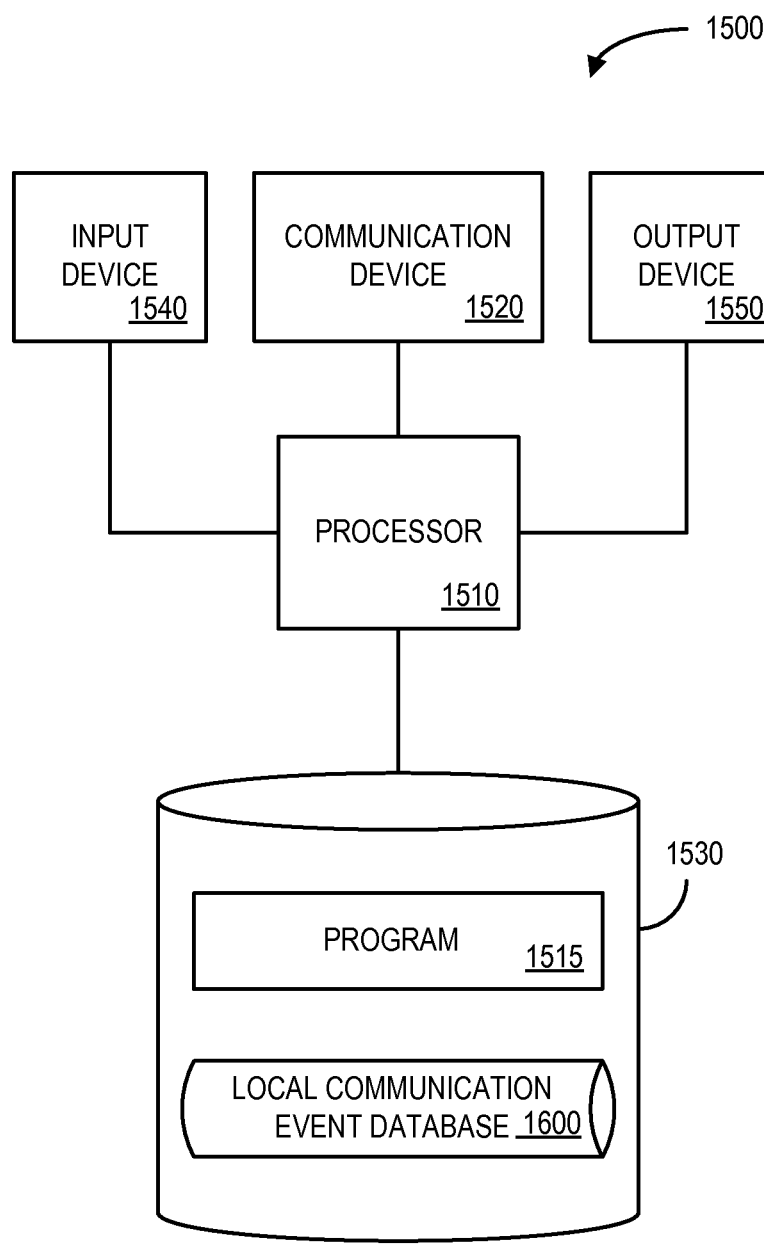
FIG. 15 is a block diagram of a mobile communications device in accordance with some embodiments of the present invention.

FIG. 15 is a block diagram of a mobile communication apparatus 1500 in accordance with some embodiments of the present invention. The apparatus 1500 might, for example, comprise a platform or engine similar to the mobile communication device 110 illustrated in FIG. 1. The apparatus 1500 comprises a processor 1510 coupled to a communication device 1520 configured to communicate via a communication network (not shown in FIG. 15). The communication device 1520 may be used to exchange communication information, for example, with one or more remote devices.

The processor 1510 is also in communication with an input device 1540. The input device 1540 may comprise, for example, a keyboard, a mouse, or computer media reader. Such an input device 1540 may be used, for example, to receive search request or a token selection from a user. The processor 1510 is also in communication with an output device 1550. The output device 1550 may comprise, for example, a display screen or printer. Such an output device 1550 may be used, for example, to display tokens and context appropriate information to a user.

The processor 1510 is also in communication with a storage device 1530. The storage device 1530 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 1530 stores a program 1515 for controlling the processor 1510. The processor 1510 performs instructions of the program 1515, and thereby operates in accordance any embodiments of the present invention described herein. For example, the processor 1510 may detect an initiating event via a context application, and responsive to that detection, stored information may be searched by the processor 1510. The searched information might include, for example, information stored by other native applications of the apparatus 1500, a local cache of information maintained by the context application, and/or information stored at remote systems or servers. At least one result of the search may then be displayed to the user via the output device 1550.

As used herein, information may be "received" by or "transmitted" to, for example: (i) the mobile communication apparatus 1500 from other devices; or (ii) a software application or module within the mobile communication apparatus 1500 from another software application, module, or any other source.

As shown in FIG. 15, the storage device 1530 also stores a local communication event database 1600. One example of such a database 1600 that may be used in connection with the mobile communication apparatus 1500 will now be described in detail with respect to FIG. 16. The illustration and accompanying descriptions of the database presented herein are exemplary, and any number of other database arrangements could be employed besides those suggested by the figures. For example, note that some or all of the information in the local communication event database might be stored at a remote server (e.g., associated with a CRM application). According to some embodiments, no event communication database is present (e.g., a context application might simply search local and/or remote stores of information maintained by other applications).

Figure 16:
FIG. 16 is a tabular view of a portion of a communication event database in accordance with some embodiments of the present invention.

FIG. 16 is a tabular view of a portion of a local communication event database 1600 in accordance with some embodiments of the present invention. The table includes entries associated with various communication events that have been initiated or received by a mobile communication device. The table also defines fields 1602, 1604, 1606, 1608, 1610 for each of the entries. The fields specify: an event identifier 1602, an event type 1604, an event day/time 1606, one or more event tokens 1608, and associated event IDs 1610. The information in the database 1600 may be periodically created and updated based on events initiated from or received by a mobile communication device.

The event identifier 1602 may be, for example, an alphanumeric code associated with a particular communication event, and the event type 1604 might indicate a native application that initiated or received the event (e.g., that the event as an inbound telephone call or an outbound email). The event date/time 1606 might indicate when the event occurred and/or how long the event lasted. The event tokens 1608 might include one or more "tokens" (e.g., character strings) that were discovered in the communication. The associated event IDs 1610 might indicate that the context client has already determined that other events are related to the event associated with the event identifier 1602. In other embodiments, the related events are determined when the user initiates a context search.

Note that a communication event, such as an email, may be parsed for tokens in a number of different ways. For example, the parsing might use syntax and/or a language analyzer to find the most relevant items. Note that since the user is able to select from multiple potential tokens of interest, the parsing might not need to be perfectly accurate. In some case, character string patterns may be used to identify tokens (e.g., when it is known that product identifiers containing exactly eight digits are commonly exchanged by the user). According to some embodiments, all words starting with a capital letter might be flagged as a potential token. Similarly, underlined, italicized, and or "quoted" text might be flagged as potential tokens of interest to the user. A user might be allowed to insert a special symbol in an email message to indicate that a portion of that message should be considered a token. In some embodiments, a parsing engine may scan through an email (or SMS text message or calendar entry), delete the uninteresting words (e.g., pronouns and conjunctions) and then display the leftover words (i.e. "keywords") in a list of tokens.

When a record is added to a local communication event, the application might maintain a relatively small index of keywords (e.g., account names, contact name, product names, and case numbers). In this case, a parsing engine might put tokens in an email that match those keywords higher up on the list of tokens displayed to the user (e.g., because those tokens may be prioritized as being more likely to be of interest to the user). In other cases, a list of tokens might be displayed in alphabetical order. In addition to adjusting the order of a token list, a context application might flag potentially important tokens (e.g., using an icon, bold text, different color, and/or an animation).

According to some embodiments, the parsing engine handles a list of acronyms, abbreviations, and aliases (e.g., stbux might equal Starbucks) that are commonly used in SMS and email messages. A parsing engine might also take into account misspellings and/or automatically and dynamically adjust a list of aliases and/or common misspellings based on prior parsing and/or user selections.

Figure 17:
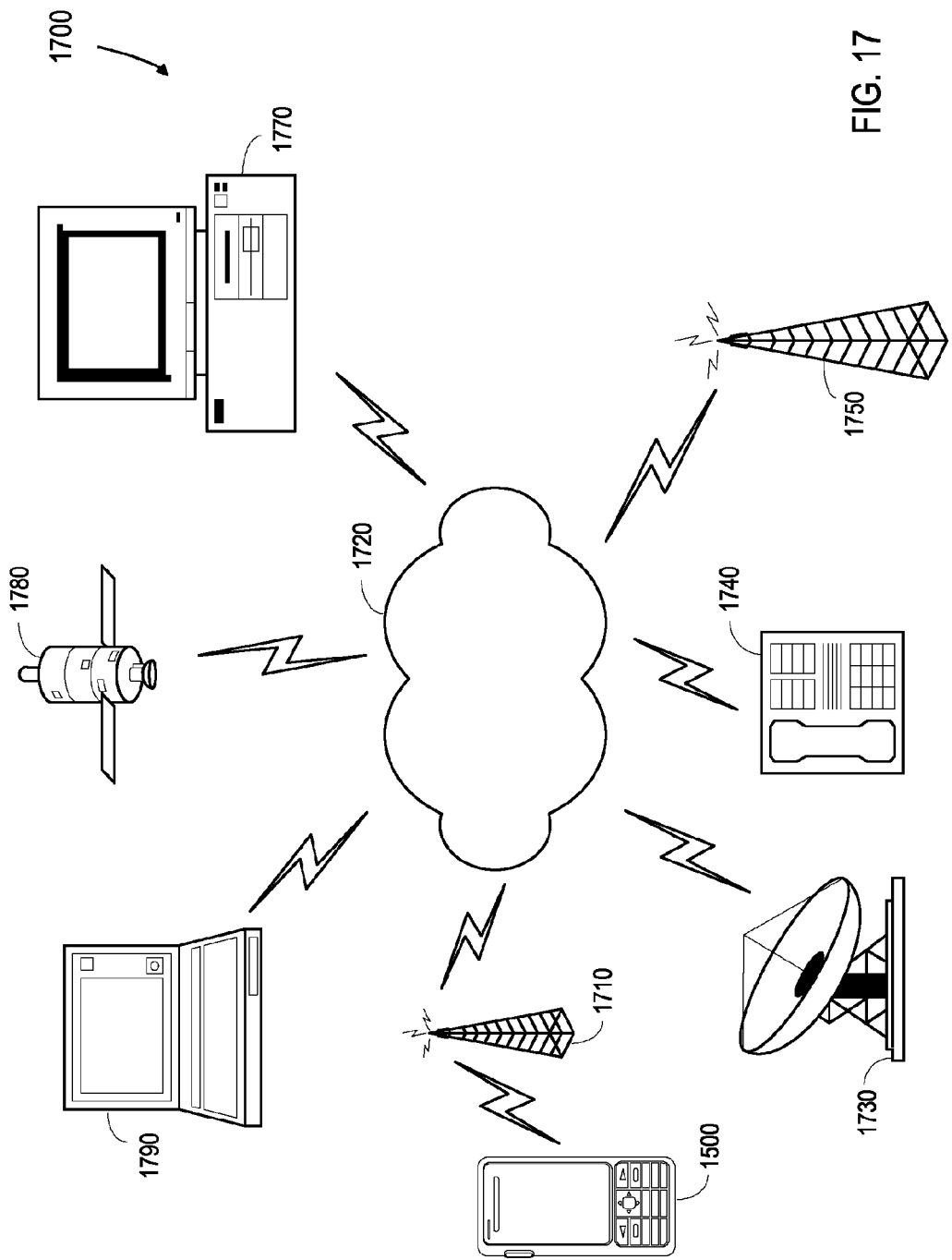
FIG. 17 is a diagram of a system architecture according to some embodiments.

The above-mentioned communication event signals, such as voice calls and text messages, may pass through any number of networks, devices and protocols before reaching their intended recipient. FIG. 17 is a partial diagram of a communication architecture 1700 according to some embodiments.

Mobile communication apparatus 1500 (in this example, a cellular telephone) is shown in communication with tower 1710, which may forward the transmission to communication network 1720 according to governing protocols. Communication network 1720 may include any number of devices and systems for transferring data, including but not limited to local area networks, wide area networks, telephone networks, cellular networks, fiber-optic networks, satellite networks, infra-red networks, radio frequency networks, and any other type of networks which may be used to transmit information between devices. Additionally, data may be transmitted through communication network 1720 using one or more currently- or hereafter-known network protocols, including but not limited to Asynchronous Transfer Mode (ATM), Internet Protocol (IP), Hypertext Transfer Protocol (HTTP) and Wireless Application Protocol (WAP).

Devices 1730 through 1790 are examples of some devices that may be a part of or in communication with communication network 1720. As such, devices 1730 through 1790 may receive communication events, either as intended recipients or as network nodes for passing messages. Devices 1730 through 1790 include satellite transmitter/receiver 1730, landline telephone 1740 having a telephone line interface to receive a telephone line (e.g., a cordless phone or a corded phone), communication tower 1750, desktop computer or server 1770, satellite 1780 and laptop computer 1790. Note the server 1770 might be associated with, for example, a remote database containing CRM information (e.g., to be searched by a context application executing at the cellular telephone 1500). Any other suitable devices may be used as a transmitting device or a receiving device in conjunction with some embodiments.

The elements of system 1700 may be connected differently than as shown. For example, some or all of the elements may be connected directly to one another. Embodiments may include elements that are different from those shown. Moreover, although the illustrated communication links between the elements of system 1700 appear dedicated, each of the links may be shared by other elements. Elements shown and described as coupled or in communication with each other need not be constantly exchanging data. Rather, communication may be established when necessary and severed at other times or always available but rarely used to transmit data.

Figure 18:
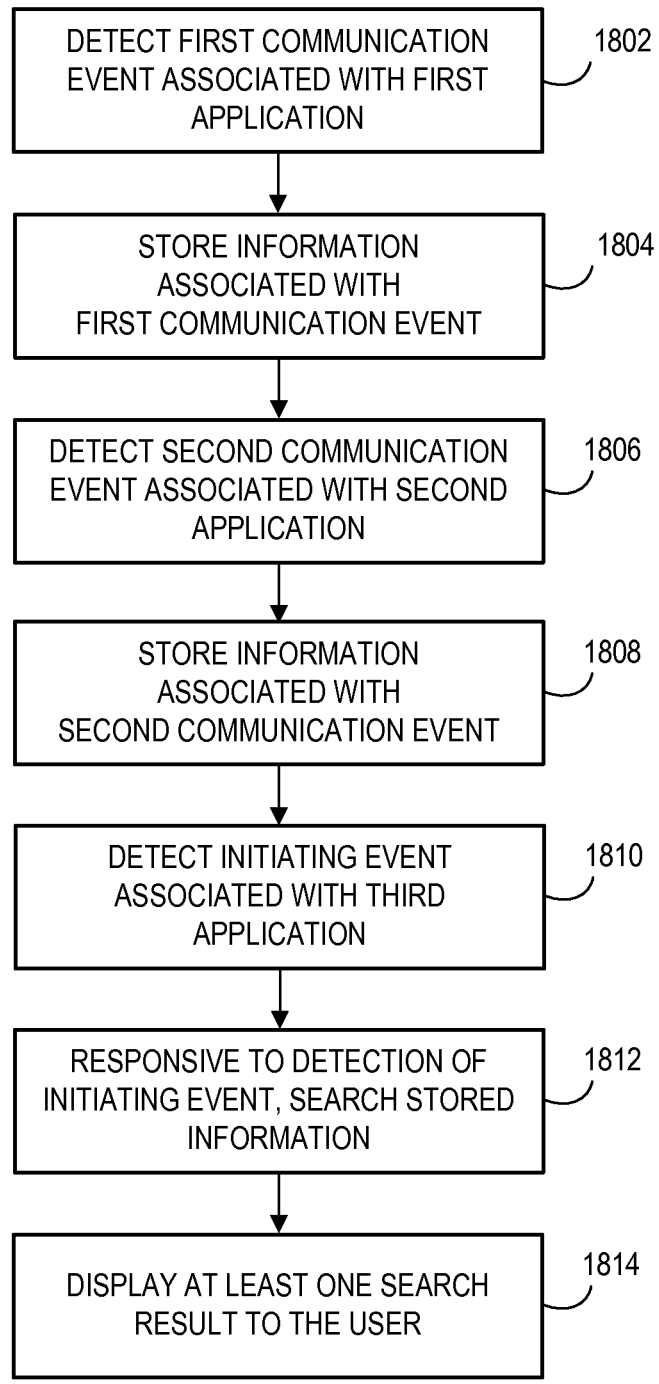
FIG. 18 is a flow diagram of a process according to some embodiments.

FIG. 18 illustrates a method that might be performed, for example, by the cellular telephone 1500 of the system 1700 described with respect to FIG. 17 according to some embodiments. At 1802, the cellular telephone 1500 detects a first communication event between the user and another party, the first communication event being associated with a first application. For example, it might be detected that the user has accepted a meeting request from a client on a particular date and time. At 1804, information associated with the first communication event may be stored at the cellular telephone 1500. For example, the client's name, the meeting date and time, and the subject of the meeting might be stored in an event database at the telephone 1500 or at a remote server (e.g., containing a CRM database).

At 1806, the cellular telephone 1500 detects a second communication event between the user and another party, the first communication event being associated with a second application different than the first application. For example, it might be detected that the user has placed a voice telephone call to the client. At 1808, information associated with the second communication event may be stored at the cellular telephone 1500. For example, the client's name, telephone number, and the call's date, time, and duration might be stored in the event database at the device 110.

Note that either the first or second communication event could represent either a communication received by the cellular telephone 1500 or a communication transmitted from the cellular telephone 1500. Moreover the two events could be associated with different parties and might comprise, for example, a telephone call, an email, a calendar event, a social networking site event, a text message, and/or an image (e.g., a photograph or video). Moreover, either the first or second application might be associated with an email application, an address book, a calendar application, a telephone application, a to-do list, a contact application, a CRM application, a social networking application, a web browser, or an SMS text messaging application.

At 1810, an initiating event associated with a third application may be detected. The initiating event might comprise, for example, a user request (e.g., he or she may press a physical button or select an icon on a display of the device 110). The initiating event might instead comprise, for example, the occurrence of a third communication event (e.g., the user might receive an email from the client).

At 1812, the information stored at the cellular telephone 1500 is searched responsive to the detection of the initiating event. For example, if the initiating event was an email from the client, the "from" and "subject" portions of the email might be used to search the event database for similar items. At least one result of said searching may then be displayed to the user at 1814. For example, a list including the scheduled meeting and telephone call between the user and the client might be displayed to the user.

The information stored in the event database could include, for example, an event type (e.g., indicating which native application was associated with the event), an event date, an event time, a party identifier, an event subject, an event duration, attachment information, and/or a "parsed" token. For example, communications between the user and other parties may be searched and parsed to identify context tokens associated with the communication event (e.g., strings of characters that might be of interest to the user at a later time). Some or all of the event database might be stored at a server remote from the cellular telephone 1500.

According to some embodiments, a list of context tokens may be displayed to the user. For example, when a user receives an email, a context application might automatically parse text information associated with the email using a keyword list and display a set of tokens to the user. The set may be prioritized (e.g., with those tokens more likely to be of interest being placed near the top of the display). The user may then select one or more of the context tokens. Those selected tokens can be used to perform a search in the local event database and the result of the search may be displayed to the user. Note that the parsing might be associated with a keyword list, an alias list (e.g., correlating nicknames and abbreviations), a language analyzer (e.g., using the syntax of one or more languages to identify potential tokens of interest), and/or a speech-to-text converter.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases and engines described herein may be split or combined). Moreover, other types of native applications and/or parsing techniques may be used in addition to, or instead of, those described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A mobile communication device associated with a user, comprising:
   a communication element to transmit and receive data via a wireless network;
   a processor coupled to the communication device; and
   a storage device in communication with said processor and storing instructions adapted to be executed by said processor to:
   detect, at the mobile communication device, an initiating event associated with a context application,
   parse a communication between the user and another party to identify one or more context tokens associated with a current communication event,
   responsive to the detection of the initiating event, search contextual information using a selected context token from among the one or more context tokens, wherein the contextual information is related to prior communication events associated with one or more native communication applications of the mobile communication device, and display to the user at least one contextual information result of said searching.

2. The mobile communication device of claim 1, wherein the searched information comprises at least one of: (i) data in a local storage local to the mobile communication device, or (ii) data at a remote storage location.

3. The mobile communication device of claim 1, wherein at least one prior communication event is associated with at least one of: (i) a communication received by the mobile communication device, or (ii) a communication transmitted from the mobile communication device.

4. The mobile communication device of claim 1, wherein at least one prior communication event is associated with at least one of: (i) a telephone call, (ii) an email, (iii) a calendar event, (iv) a social networking site event, (v) a text message, or (vi) an image.

5. The mobile communication device of claim 1, wherein at least one communication application is associated with at least one of: (i) an email application, (ii) an address book, (iii)

a calendar application, (iv) a telephone application, (v) a to-do list, (vi) a contact application, (vii) a client relation management application, (viii) a social networking application, (ix) a web browser, or (x) a text messaging application.

6. The mobile communication device of claim 1, wherein the initiating event is associated with a user input.

7. The mobile communication device of claim 1, wherein the initiating event is associated with an occurrence of a new communication event.

8. The mobile communication device of claim 1, wherein the searched information includes at least one of: (i) an event type, (ii) an event date, (iii) an event time, (iv) a party identifier, (v) an event subject, (vi) an event duration, (viii) attachment information, or (ix) a parsed context token.

9. The mobile communication device of claim 1, further comprising:
 displaying to the user a list of the one or more context tokens;
 receiving from the user an indication of the selected context token; and
 displaying to the user information about other communication events associated with the selected context token.

10. The mobile communication device of claim 9, further comprising:
 prioritizing context tokens within the list of context tokens displayed to the user.

11. The mobile communication device of claim 1, wherein said parsing is associated with at least one of: (i) a keyword list, (ii) an alias list, (iii) a language analyzer, (iv) a multi-language analyzer, or (v) a speech-to-text converter.

12. The mobile communication device of claim 1, wherein the identified context tokens are locally stored at the mobile communication device.

13. A method, comprising:
 detecting, at a wireless telephone, a first communication event between a user and another party, the first communication event being associated with a first native application of the telephone;
 storing, at the telephone, contextual information associated with the first communication event;
 detecting, at the telephone, a second communication event between the user and another party, the second communication event being associated with a second native application different than the first application;
 storing, at the telephone, contextual information associated with the second communication event;
 detecting an initiating event associated with a third application;
 parsing a communication between the user and another party to identify one or more context tokens associated with a current communication event;
 responsive to the detection of the initiating event, searching both the contextual information stored at the telephone and additional contextual information stored remote from the telephone, the search using a selected context token from among the one or more context tokens; and
 displaying to the user at least one contextual information result of said searching.

14. The method of claim 13, wherein the first application is associated with at least one of: (i) an email application, (ii) an address book, (iii) a calendar application, (iv) a telephone application, (v) a to-do list, (vi) a contact application, (vii) a client relation management application, (viii) a social networking application, (ix) a web browser, or (x) a text messaging application.

15. The method of claim 13, wherein the initiating event is associated with a user input.

16. The method of claim 13, wherein the initiating event is associated with an occurrence of a third communication event.

17. A non-transitory computer-readable medium storing instructions adapted to be executed by a processor to perform a method, said method comprising:
 detecting, at a wireless telephone, an initiating event associated with a context application;
 parsing a communication between the user and another party to identify one or more context tokens associated with a current communication event;
 responsive to the detection of the initiating event, searching contextual information using a selected context token from among the one or more context tokens, wherein the contextual information is related to: (i) a prior voice connection between a user and another party, the voice telephone connection being associated with a first native application of the telephone and (ii) an email between the user and another party, the email being associated with a second native application; and
 displaying to the user at least one contextual information result of said searching.

18. The non-transitory computer-readable medium of claim 17, wherein execution of the instructions further results in:
 displaying to the user a list of the one or more set of context tokens associated with the current communication event;
 receiving from the user an indication of the selected context token; and
 displaying to the user information about other communication events associated with the selected context token.

19. The non-transitory computer-readable medium of claim 17, further comprising:
 parsing information associated with the current communication event to determine the set of context tokens, wherein said parsing is associated with at least one of: (i) a keyword list, (ii) an alias list, (iii) a language analyzer, (iv) a multi-language analyzer, or (v) a speech-to-text converter.

* * * * *